(12) United States Patent
Jeske et al.

(10) Patent No.: US 6,463,546 B1
(45) Date of Patent: Oct. 8, 2002

(54) METHOD AND APPARATUS FOR MONITORING A MICROPROCESSOR

(75) Inventors: Frank Jeske, St. Georgen (DE); Hermann Rappenecker, Vöhrenbach (DE)

(73) Assignee: Papst-Motoren GmbH & Co. KG, St. Georgen (DE)

( * ) Notice: Subject to any disclaimer, the term of this patent is extended or adjusted under 35 U.S.C. 154(b) by 0 days.

(21) Appl. No.: 09/230,884

(22) PCT Filed: Aug. 8, 1997

(86) PCT No.: PCT/EP97/04318

§ 371 (c)(1),
(2), (4) Date: Feb. 2, 1999

(87) PCT Pub. No.: WO98/07089

PCT Pub. Date: Feb. 19, 1998

(30) Foreign Application Priority Data

Aug. 12, 1996 (DE) .......................... 196 32 506

(51) Int. Cl.⁷ .............................. G06F 1/12; G06F 1/04
(52) U.S. Cl. ................ 713/400; 713/401; 713/500; 713/501; 713/502; 713/503; 713/600
(58) Field of Search .............................. 714/55; 710/25; 713/400, 401, 500, 501, 502, 503, 600, 601

(56) References Cited

U.S. PATENT DOCUMENTS

| 4,429,236 A | 1/1984 | Nitschke | 307/362 |
|---|---|---|---|
| 4,512,019 A | 4/1985 | Bodig | 371/12 |
| 4,674,035 A | 6/1987 | Engel | 364/200 |
| 4,879,647 A | 11/1989 | Yazawa | 364/200 |
| 4,956,807 A | 9/1990 | Osaka | 364/900 |
| 5,017,846 A | 5/1991 | Young | 318/244 |
| 5,073,853 A | 12/1991 | Johnson | 395/575 |
| 5,081,625 A | 1/1992 | Rhee | 371/16.3 |
| 5,270,622 A | 12/1993 | Krause | 318/254 |
| 5,426,776 A * | 6/1995 | Erdman | 714/55 |
| 5,590,235 A | 12/1996 | Rappenecker | 388/803 |
| 5,845,045 A | 12/1998 | Jeske | 388/804 |
| 5,942,926 A * | 8/1999 | Yamaguchi | 3327/156 |

FOREIGN PATENT DOCUMENTS

| DE | 32 14 006 A1 | 10/1983 |
|---|---|---|
| DE | 44 30 177 A1 | 3/1995 |
| DE | 44 41 372 A1 | 6/1995 |
| EP | 0 649 217 A1 | 4/1995 |

OTHER PUBLICATIONS

NEC Corp., datasheet re microprocessor 17103 (pub. 1994?; pp. I–2–262 through I–2–285).

* cited by examiner

*Primary Examiner*—Peter Wong
*Assistant Examiner*—Tim Vo
(74) *Attorney, Agent, or Firm*—Milton Oliver; Ware, Fressola Van Der Sluys & Adolphson LLP

(57) ABSTRACT

A watchdog circuit for a microprocessor which has a reset input and a control output, which output, when operation is normal, periodically delivers, under program control, a signal (P0B2) of predefined duration ($t_1$); and having a capacitor (32) that can be charged via a charging circuit; having a discharging circuit (40, 42), controlled by the control output, for said capacitor (32), for periodic discharge thereof during the predefined duration ($t_1$); the charging circuit and discharging circuit being adapted to the program sequence of the microprocessor such that when the microprocessor is operating normally, charging of the capacitor via the charging circuit corresponds respectively to discharge thereof via the discharging circuit; so that the voltage at said capacitor rises and falls within a predefined voltage range; and having an apparatus (30), for monitoring the charge state of said capacitor (32), which, in the presence of a charge state thereof that does not occur in normal operation, effects a reset operation in the microprocessor.

13 Claims, 11 Drawing Sheets

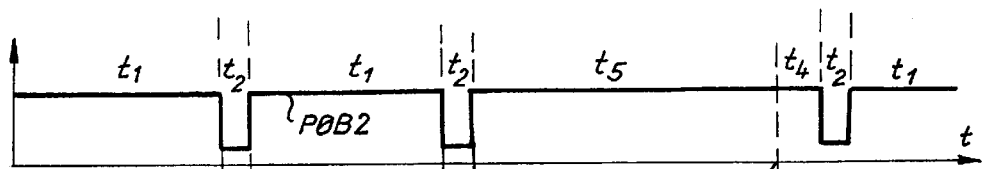
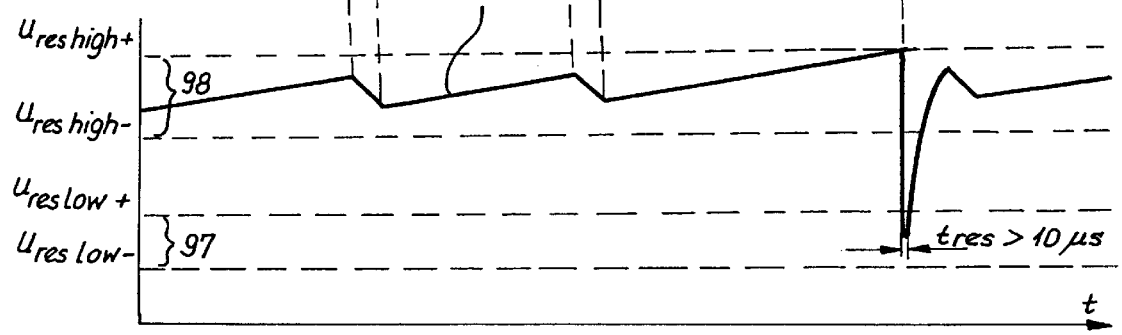
Fig. 10A
Fig. 10B
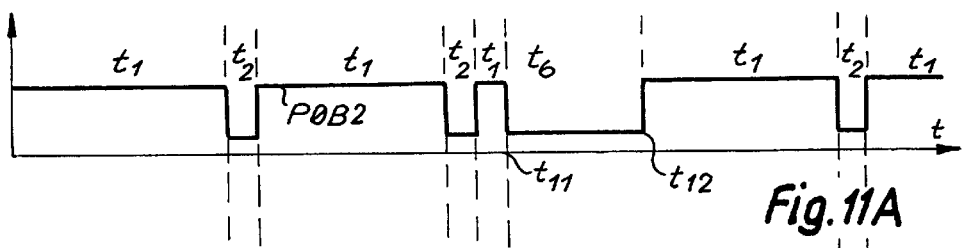
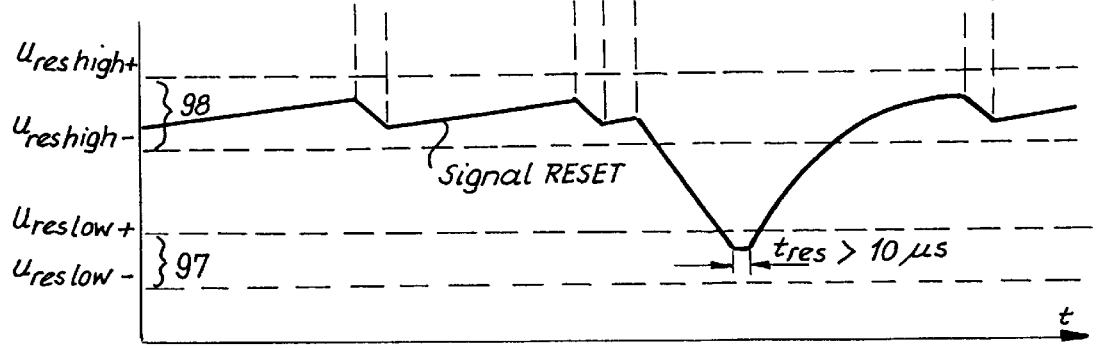
Fig. 11A
Fig. 11B

METHOD AND APPARATUS FOR MONITORING A MICROPROCESSOR

FIELD OF THE INVENTION

Low-cost microcontrollers or microprocessors can be used to perform simple tasks, for example to monitor rotation speed or control motors; both species will generically be referred to hereinafter as "microprocessors." Low-cost microprocessors of this kind often contain only a minimum number of functions. An internal watchdog circuit is usually not present in them.

BACKGROUND

A "watchdog" refers to a circuit which monitors whether the microprocessor is operating correctly and which, when a fault is ascertained, authorizes appropriate steps for correction, for example a reset operation for the microprocessor, so that the latter begins to operate with defined initial values ("initialization") from a specific program point. More-expensive microprocessors usually have such a watchdog function built in, or they have externally a corresponding additional circuit.

If no such watchdog circuit is present, the problem arises of operating the microprocessor reliably. For example, if the latter does not achieve a clean reset (power-up reset) after operating voltage is switched on, its microprogram may in some circumstances not start at a defined point, which can then result in corresponding faults. A microprocessor of this kind can also be disturbed by external influences, for example by bursts, transient pulse groups, etc. (tests defined by IEC 801-2 and IEC 801-4). Large fluctuations in supply voltage can also result in program execution faults.

In all these cases, the operation of the microprocessor can be briefly disturbed. If the microprocessor returns to correct operation after the disturbance has ended, this causes no problems; but in such cases the microprocessor can also permanently "hang up," i.e. be suspended in an undefined state. In this instance the microprocessor is no longer performing its desired function, which is usually not permissible.

Numerous circuits for monitoring such microprocessors are therefore known, for example from DE 32 14 006 A1 and corresponding U.S. Pat. No. 4,512,019 or EP-A1 0 658 973 and corresponding U.S. Pat. No. 5,590,235.

An apparatus as defined by the latter document is particularly low-cost and reliable, but requires a special program structure so that no data are lost during a reset operation. Since, with this arrangement, a reset operation takes place with each motor revolution, these reset operations must occur in program segments in which the interruption resulting from the reset operation has no deleterious consequences. A program structure of this kind is not possible for all applications, for example if the microprogram consists principally of software counters which would be continually disturbed by the effects of such a reset operation. Correct real-time measurement would thus be very difficult.

A known apparatus of this kind with cyclical reset operations is also ineffective if the reset signals are completely absent. Such is the case, for example in a motor, if the rotor is immobilized and no further reset signals are therefore being generated. With small motors in particular, such as those which are used to drive equipment fans and have lower outputs (for example from 1 to 3 W), the rotor can easily be immobilized by external influences, and in such a case no further reset operations take place.

SUMMARY OF THE INVENTION

One object of the invention is therefore to make available a new method for monitoring a microprocessor, and an apparatus for carrying out such a method.

According to the invention, this object is achieved by using capacitor charging and discharging circuits which respond to normal operation of the microprocessor by maintaining the voltage on the capacitor within a predetermined range, and a watchdog circuit which responds to capacitor voltage outside the predetermined range by resetting the microprocessor. The result is a simple, space-saving, and low-cost watchdog apparatus which can be carried out on small circuit boards. With it, reliable operation of a device can be maintained even in a highly disturbed environment, and it is possible to achieve higher interference classes in government tests. In addition, the microprocessor runs reliably regardless how quickly or slowly its operating voltage rises. The invention can also be used in microprocessors which have an internal WI (watchdog), since operating reliability is additionally enhanced by an external WD. (The internal WD may also be subject to disturbance and may not function, in which case the external WD then becomes effective.)

BRIEF FIGURE DESCRIPTION

Further details and advantageous developments of the invention are evident from the exemplifying embodiments, which are described below and depicted in the drawings and are in no way to be understood as a limitation of the invention, and from the remaining claims. In the drawings:

FIGS. 10A and 11B show diagrams to explain the manner of operation in the event of a fault of the kind depicted in FIG. 6;

FIGS. 11A and 11B show diagrams to explain the manner of operation in the event of a fault of the kind depicted in FIG. 7;

DETAILED DESCRIPTION

Figure 1:
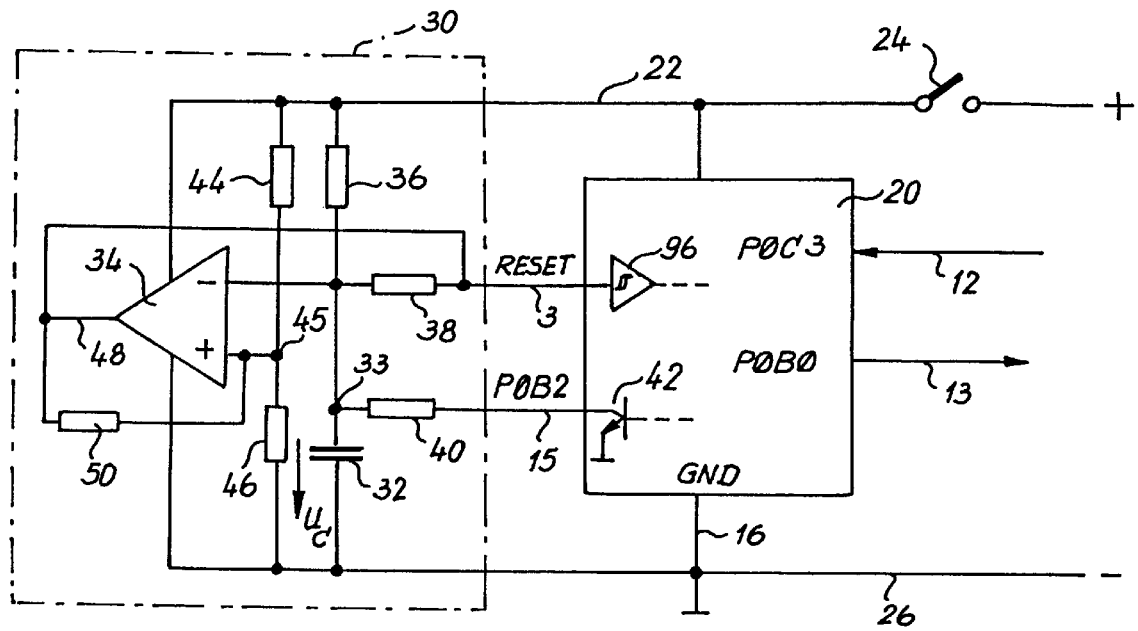
FIG. 1 shows a basic circuit diagram of a microcontroller with an attendant watchdog circuit.

FIG. 1 shows on the right a microprocessor 20 which is supplied with power, e.g. 5 VDC, via a positive line 22 and a switch 24 arranged therein, and via a negative line 26. Microprocessor 20 must start correctly when switch 24 is closed; this requires a reset operation which is referred to as a power-up reset, for which purpose a "low" signal of a predetermined minimum duration must be applied to reset input 3.

Figure 2:
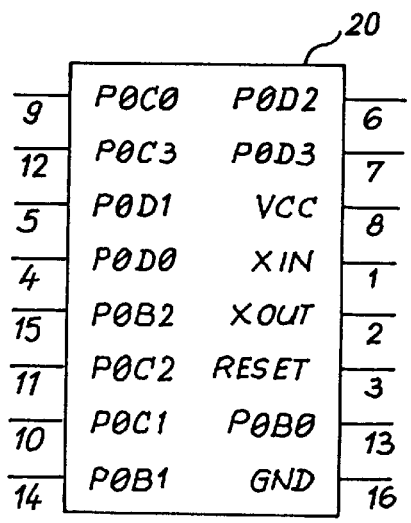
FIG. 2 shows the various inputs and outputs of the NEC17103GS microcontroller such as can be used in the present circuit.

Microprocessor 20 can, for example, be the 17103GS microcontroller of the NEC company that is depicted in FIG. 2, which has no internal WD circuit. The circuit depicted is, however, of course suitable for any type of microprocessor or microcontroller, and FIG. 2 depicts only a preferred exemplifying embodiment with which the invention can be explained by reference to a concrete example (WD= watchdog).

Depicted in FIG. 1 to the left of microprocessor 20 is a WD circuit 30 which in principle represents an oscillator that in normal operation is prevented by microprocessor 20 from oscillating, but begins to oscillate—usually only a single oscillation—if microprocessor 20 is not functioning correctly. This oscillation generates a reset signal for input 3, and that then causes microprocessor 20 to restart at a specific program point and with a predefined initialization.

WD circuit 30 contains a capacitor 32 whose one terminal is connected to negative line 26, and whose other terminal 33 is connected to the negative input of a comparator 34. Terminal 33 is also connected via a resistor 36 to positive line 22, via a resistor 38 to reset input 3, and via a resistor 40 to an output 15 of microprocessor 20 to which, in operation, a POB2 signal is applied. This output 15 has in the interior of microprocessor 20 an open-collector NPN transistor 42 (as depicted); when transistor 42 is conductive, output 15 has a "low" potential, and when transistor 42 is nonconductive, output 15 has a "high" potential. During normal operation of microprocessor 20, this transistor 42 is periodically opened and closed, and when it is closed, a discharge current flows from capacitor 32 through resistor 40 and transistor 42. When transistor 42 is open, no discharge current flows and capacitor 32 can charge up via resistor 36.

The positive input of comparator 34 has applied to it at a node point 45, via a voltage divider made up of resistors 44 and 46, a predefined potential, for example a potential of +4.5 V for an operating voltage of 5 V. Output 48 of comparator 34 is connected directly to reset input 3, and via a resistor 50 to the positive input of comparator 34.

Typical Values

| | |
|---|---|
| Voltage between lines 22 and 26 | 5 V |
| Microprocessor 20 | NBC 17103 GS |
| Comparator 34 | LM2903 (SGS) |
| Capacitor 32 | 100 Nf |
| Resistor 36 | 20 kΩ |
| Resistors 38, 46 | 100 kΩ |
| Resistor 40 | 3 kΩ |
| Resistor 44 | 10 kΩ |
| Resistor 50 | 220 kΩ |

In operation, signals are conveyed from outside to input 12 of microprocessor 20, and are analyzed internally by the microprocessor according to predefined rules; it then delivers corresponding output signals at an output 13 (or at several outputs).

Mode of Operation of WD Circuit 30

In order to explain the mode of operation, it will initially be assumed that resistor 40 has an infinite value, i.e. that open-collector transistor 42 is nonconductive.

When switch 24 is actuated, a charging current flows through resistor 36 to capacitor 32, increasing the voltage $u_c$ there. Since capacitor 32 is in a discharged state upon start-up, $u_c=0$ upon start-up and, in this case, input 3 of microprocessor 20 therefore receives the necessary reset signal for a power-up reset.

When the voltage $u_c$ reaches the potential at node point 45, i.e. for example +4.5 V, comparator 34 switches over, i.e. its previously "high" output 48 now acquires the potential of negative line 26. The effect of resistor 50 is that the potential at node 45 thereby decreases somewhat, e.g. from +4.5 to +4.0 V, so that capacitor 32 is now discharged through resistor 38 and comparator 34 until the voltage $u_c$ has dropped below 4.0 V.

When this voltage is reached, comparator 34 switches over again: its output 48 once again becomes "high", the potential at node 45 jumps back up to 4.5 V, and capacitor 32 is again charged through resistor 36 until the voltage $u_c$ again reaches a value of 4.5 V.

In this case, the voltage $u_c$ thus oscillates between, for example, 4.0 and 4.5 V, and circuit 30 then acts as an oscillator which delivers, at its output 48, periodic reset pulses to input 3.

The principle of the overall circuit shown in FIG. 1 is that when microprocessor 20 is operating normally, transistor 42 periodically becomes conductive and thereby continually discharges capacitor 32 to the point that the voltage $u_c$ cannot attain the value of e.g. 4.5 V at which comparator 34 switches over, but rather lies, for example, only in the range from 4 to 4.2 V.

In the event of a fault in the program sequence, however, this periodic discharge through transistor 42 and resistor 40 does not occur, so that the voltage $u_c$ reaches the value 4.5 V and an oscillation of WD circuit 30 takes place in order to initiate a reset signal at input 3. Normally only a single oscillation occurs, since usually the single "low" potential at reset input 3 is sufficient to effect a defined reset operation in microprocessor 20.

Figure 3:
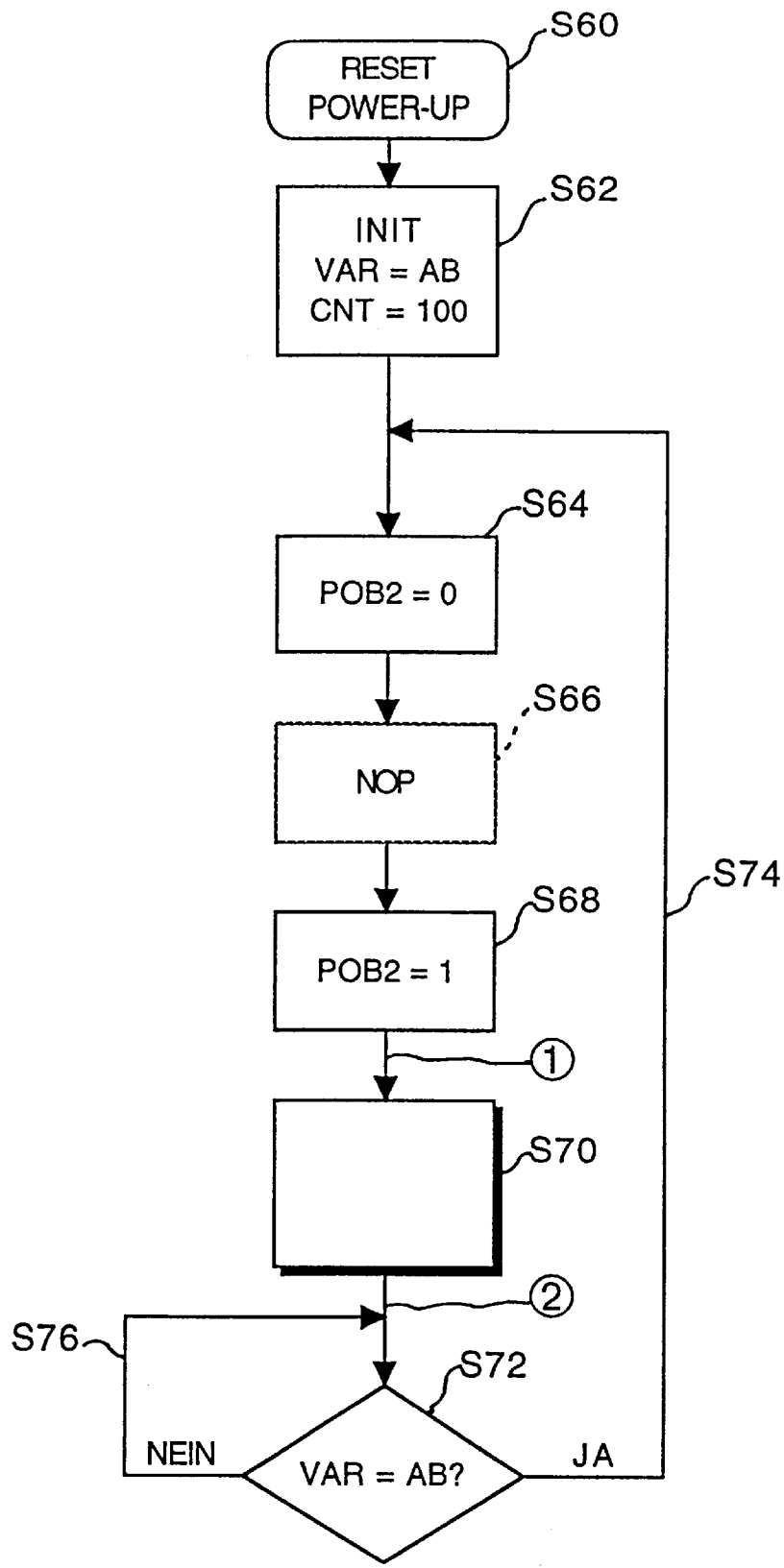
FIG. 3 shows the flowchart of a first variant of the program sequence with which periodic pulses can be generated at an output of the microcontroller during normal operation.

FIG. 3 shows the flowchart for a first variant of a program suitable for generating a periodic signal at output POB2, and for simultaneous monitoring of the proper operation of microprocessor 20. In step S60, a reset operation takes place, for example a reset operation in the event of a fault, or a power-up reset when switch 24 is activated. At step S62 an initialization takes place, i.e. registers are set to specific values; the example given is that the value of a counter CNT (in microprocessor 20) is set to 100 (cf. FIG. 16 below), and the value AB is stored in a memory VAR. The quantity AB can be, for example, a sequence of several bits, e.g. 011001. The higher the number of such bits, the more reliably the circuit operates.

In step S64, transistor 42 in microprocessor 20 is made conductive so that P0B2 becomes equal to 0. One or more NOP (short for "NO OPERATION") instructions can follow in optional step S66; practical experience has shown that these NOP instructions can be omitted in many cases. The reason for this is that the duration of steps S64 and S68 is often itself long enough for sufficient discharge of capacitor 32.

In step S68, transistor 42 is opened again so that P0B2 becomes equal to 1. In program segment S70, the actual working steps of the microprocessor 20 occur, i.e. analysis of data, e.g. control, regulation, etc. A program segment of this kind will be explained below in exemplifying fashion with reference to FIG. 16. In the case of an electronically commutated motor, this program segment can serve, for example, to control commutation, limit current, or regulate speed, to name only a few examples.

In step S72, memory VAR is queried or polled, i.e. a check is made as to whether the latter contains the value AB. If so, this is an indication that the microprocessor is operating normally and has executed step S62 in normal fashion, and the program then jumps back via loop S74 to step S64.

If it is found in step S72 that memory VAR does not contain the value AB, this is an indication that a fault has occurred, and in this case the program enters an infinite loop S76, i.e. steps S64 through S70 are no longer run through. Transistor 42 thereby remains nonconductive, and the P0B2 signal continuously maintains a value of 1, so that capacitor 32 is now charged to a higher voltage and oscillator 30 begins to oscillate. With its first oscillation it generates, at output 48 of comparator 34, a "low" signal which is conveyed to input 3 of microprocessor 20 where it initiates a reset operation, so that the program sequence begins again at step S60 and the fault in the program sequence is thereby remedied. The oscillation of oscillator 30 ceases immediately as a result, i.e. in normal circumstances it generates only a single reset pulse in such an operation, and then immediately becomes inactive again.

It is clear that the flowchart as shown in FIG. 3 can be used only if a WD circuit is provided since, without that circuit, microprocessor 20 would "hang up" in infinite loop S76 in the event of a fault, and refuse to perform its function.

Figure 4:
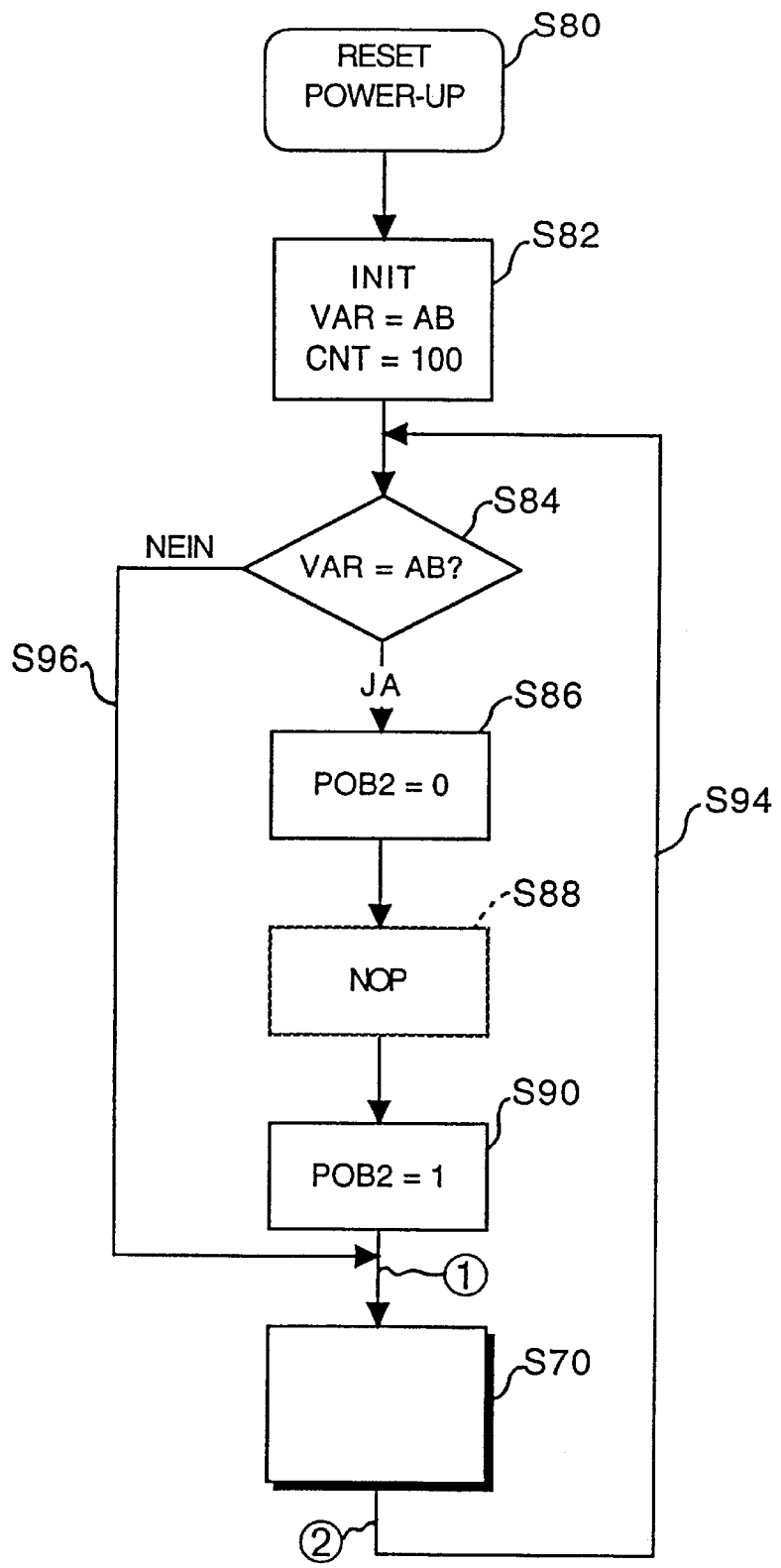
FIG. 4 shows a second variant of the microprogram for generating periodic pulses.

FIG. 4 shows the flowchart for a second variant of a program suitable for generating a periodic P0B2 signal at output 15. The flowchart shown in FIG. 4 has the advantage that it can also be used if, for cost reasons, WD circuit 30 is to be omitted, i.e. if reliable operation of microprocessor 20 is desired, but not at any price.

In step S80 a reset operation again occurs, for example upon power-up, just as described for step S60. An initialization also occurs in the next step S82, and memory VAR is loaded with a value AB, i.e. a defined bit sequence, just as described for step S62, and the contents of a counter CNT (in microprocessor 20) are set, for example, to 100 (cf. FIG. 16 concerning counter CNT).

In the subsequent step S84, memory VAR is queried as to whether it contains the value AB. If so, the program returns to step S86, where transistor 42 is made conductive, i.e. the P0B2 signal becomes equal to 0. In the subsequent optional step S88, one or more NOP instructions can follow or, in principle, instructions which consume a defined amount of time and act in practice as a timer. It has been found in practical use that such NOP instructions can in many cases be omitted at this point, since the program execution time of steps S86, S90 is sufficient for capacitor 32 to discharge. In step S90, transistor 42 is once again made nonconductive, so that the P0B2 signal becomes equal to 1, i.e. a discharge of capacitor 32 takes place only between steps S86 and S90.

In step S70, which corresponds to step S70 of FIG. 3, the actual working operations of microprocessor 20 are performed, i.e. for example regulation, control, or the like. This will be explained below with reference to FIG. 16. Once the program has executed these working operations, it returns via loop S94 back to step S84.

If it is found in step S84 that memory VAR does not contain the value AB, the program skips program steps S86, 88, and 90 (arrow S96), and goes directly to step S70; i.e. in this case, transistor 42 remains continuously nonconductive, and capacitor 32 consequently does not discharge in this case, so that WD circuit 30 begins to oscillate, and at the output of comparator 34 delivers a reset pulse to input 3 of microprocessor 20, causing the program to jump back to step S80 and begin operating again. The value AB is then loaded into memory VAR, so that the response to the subsequent inquiry S84 is positive, and periodic signals are once again generated at output P0B2 of microprocessor 20, effecting the desired partial discharge of capacitor 32.

As already explained, a microprocessor 20 can also operate using the flowchart shown in FIG. 4 even if WD circuit 30 is omitted, since in such a case, if a program fault occurs, steps S86, 88, and 90 are simply skipped, but the actual program (in S70) continues to run unchanged as long as the microprocessor does not completely hang up.

Figure 5:
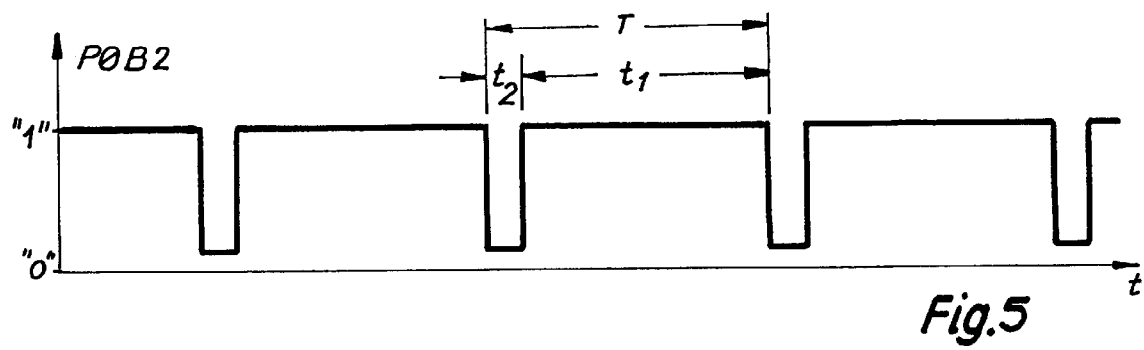
FIG. 5 shows a diagram to explain the P0B2 pulses generated in normal operation at output 15 of microprocessor 20.

Reference is made to FIG. 5 for an explanation of FIGS. 1 through 4. As is evident, the flowcharts of FIG. 3 or 4 represent cyclical processes, i.e. in normal operation the program in FIG. 3 executes steps S64, 66, 68, 70, 72 and then returns via loop S74 back to step S64. The time T (FIG. 5) required for one pass (from S64 to S64) can be, for example 50 $\mu$s, and depends a) on the number of program steps, and b) on the clock frequency of microprocessor 20, which for example can be 1 MHz. A cycle time of 50 $\mu$s thus results in a frequency of 20 kHz for the P0B2 signal.

As shown in FIG. 5, time T is composed of $t_1$ and $t_2$. Time $t_1$ is, in FIG. 3, the time period between steps S64 and S68 in which P0B2=0. During the remaining time $t_1$, P0B2=1. Only during time intervals (downward-going pulses) $t_2$ is capacitor 32 slightly and briefly discharged through resistor 40, specifically at a frequency of, for example, 20 kHz, i.e. 20,000 times per second. During time $t_1$, capacitor 32 is charged through resistor 36.

The situation in FIG. 4 is entirely analogous. Here again, in normal operation the program runs through steps S84, 86, 88, 90, 70, and then returns to step S84. It requires for one such execution pass, for example, a time T of 50 $\mu$s corresponding to a frequency of 20 kHz, and here again the time $t_2$ (FIG. 5) is determined by steps S64, 66, 68.

As long as the program is running properly, the diagram shown in FIG. 5 applies; the time period T, and therefore the signal frequency, may fluctuate somewhat but is substantially constant. The pulse duty factor of the P0B2 signal can, as depicted, be approximately 1:10.

Figure 6:
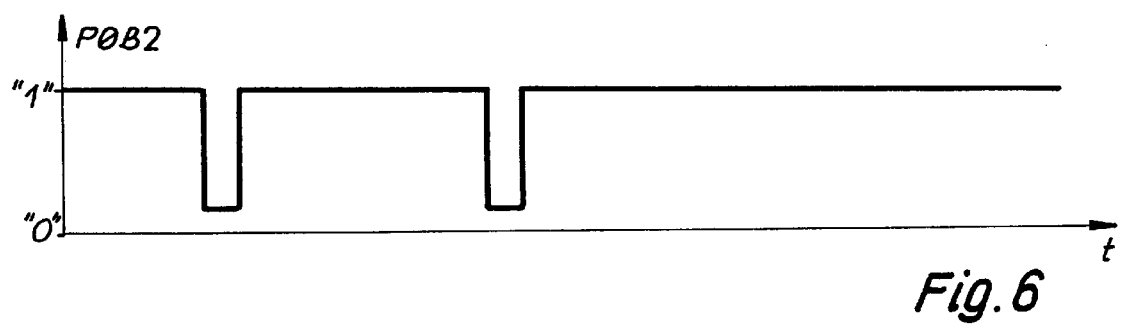
FIG. 6 shows a diagram analogous to FIG. 5, but in the event of a disturbance of a first kind in the microprocessor.

If it is found in FIG. 3 or 4 that memory cells VAR do not contain the values AB, P0B2 then remains equal to 1, i.e. the situation shown in FIG. 6 results, and the frequency of this signal becomes zero. If the program "hangs up" at some point, this can also result in the continuous state POB2=1.

Figure 7:
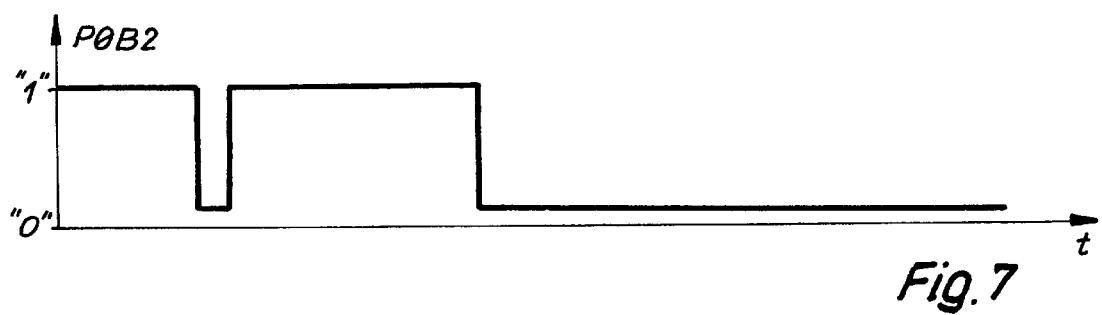
FIG. 7 shows a diagram analogous to FIG. 5, but in the event of a disturbance of a second kind in the microprocessor.

The situation shown in FIG. 7 results if the program in FIG. 3 hangs up between steps S64 and 68, or in FIG. 4 between steps S86 and 90, i.e. POB2 then becomes equal to 0, and the frequency of this signal also becomes zero.

In the situations shown in FIGS. 6 and 7, a reset pulse must be generated so that the program can start again at S60 in FIG. 3, or at S80 in FIG. 4. This is achieved using WD circuit 30 of FIG. 1.

Figure 8:
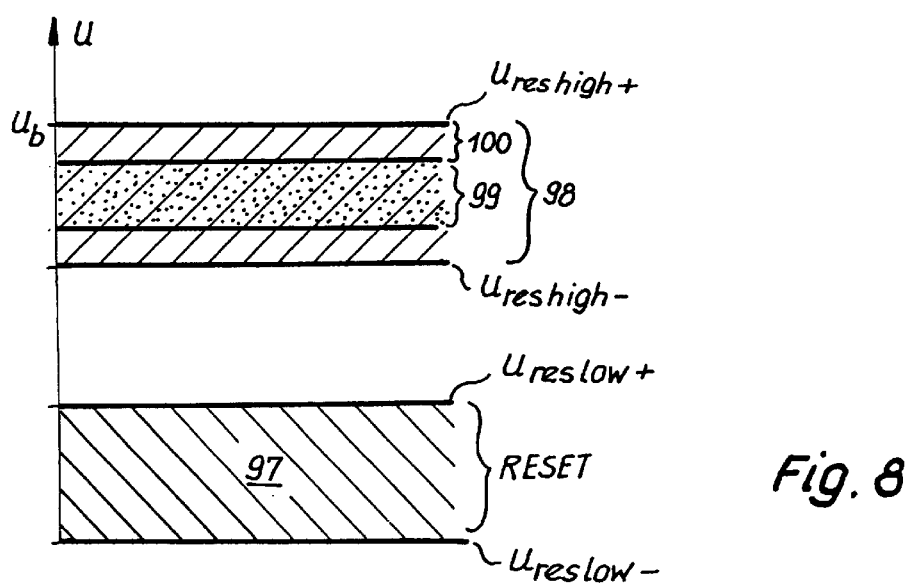
FIG. 8 shows a diagram to explain the manner of operation of FIG. 1, 13, or 14.

As depicted in FIG. 1, reset terminal 3 of microprocessor 20 has a Schmitt trigger input 96. Such is the case for the reset inputs of most microprocessors. As shown in FIG. 8, a reset operation takes place if the RESET signal has a low value (LOW) that lies in a range 97 between 0 V and approximately ⅓×Ub, i.e. between $U_{reslow-}$ and $U_{reslow+}$. It is certain, on the other hand, that a reset operation will not take place if the RESET signal lies in a high range 98 (HIGH) between ⅔×Ub and Ub, i.e. between $U_{reshigh-}$ and $U_{reshigh+}$.

The effectiveness of the WD apparatus depicted in FIG. 1 is based on the fact that in normal, undisturbed operation, the voltage $u_c$ at capacitor 32 is kept in a "safe" range or band 99 which lies within range 98, i.e.

a) above $U_{reshigh-}$, so that a reset operation definitely will not be initiated, and b) below $U_{reshigh+}$.

Below $U_{reshigh+}$ and above band 99 lies a range or band 100, and the potential of node point 45 in FIG. 1 is set to a value in this range 100, i.e. if the voltage $u_c$ reaches this range 100, this is an indication that a fault is present, and in such a case circuit 30 reacts in the manner already described and generates a reset pulse. This is the case if the fault depicted in FIG. 6 occurs, since then capacitor 32 is no longer being discharged, and the voltage $u_c$ consequently rises into range 100.

If, conversely, the fault shown in FIG. 7 occurs, capacitor 32 is continuously discharged through resistor 40 and transistor 42, and the voltage $u_c$ then assumes the value defined by the ratio between resistors 36 and 40, which in the present case can be approximately 6 to 8, i.e. the voltage $u_c$ then drops to a value in range 97, or below $U_{reslow+}$, so that a reset operation is triggered and causes the program to start running again. This ratio must allow a reliable reset operation at low $u_c$.

Figure 9A:
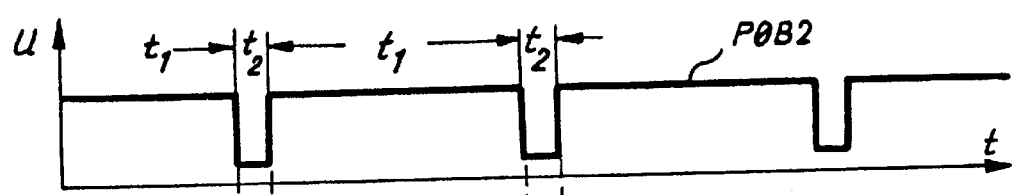
FIGS. 9A and 9B show diagrams to explain the manner of operation of FIG. 1, 9, or 14 in normal operation.
Figure 9B:
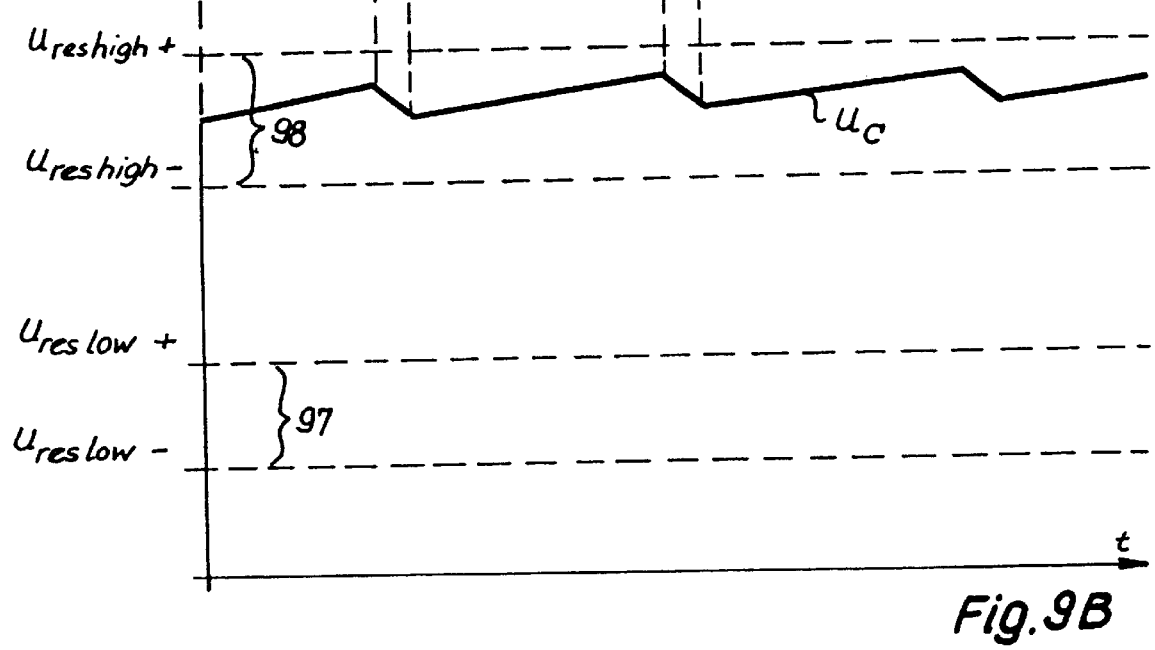

FIGS. 9A and 9B show the situation in normal operation, i.e. the POB2 signal (FIG. 9A) is present at output 15 of microprocessor 20 with a frequency of, for example, 20 kHz and a pulse duty factor of, for example, 1:10. Both values are substantially invariant in normal operation, and result in a discharge current of predefined magnitude through resistor 40; the mean value of this discharge current then corresponds to the mean value of the charging current through resistor 36, so that the voltage $u_c$ (FIG. 9B) lies within range 98 but below its upper boundary $U_{reshigh+}$. Capacitor 32 is discharged during each time $t_2$ and charged during each time $t_1$ (cf. FIG. 9B), and the result is a stable equilibrium, i.e. the mean value of $u_c$ remains constant in this instance. The maxima of voltage $u_c$ are labeled in FIG. 9B as $u_{cmax}$, and the minima as $u_{cmin}$.

This will now be explained using a quantitative example, assuming the following values (which in some cases differ from the values indicated above):

| | |
|---|---|
| Operating voltage $U_B$ on line 22 | +5.5 V |
| $U_{reshigh+}$ | +4.0 V |
| $U_{reshigh-}$ | +3.4 V |

Times defined by the program sequence:

| | |
|---|---|
| $t_1$ | 44 μs |
| $t_2$ | 5.4 μs |

In FIG. 3, for example, time $t_2$ is required for steps S64, S66, S68, and time $t_1$ for steps S70 and S72.

In this example the voltage at capacitor 32 should therefore, in normal operation, lie between $u_{cmin}$=3.5 V and $U_{cmax}$=3.9 V.

This corresponds to range 99 in FIG. 8.

The following values are additionally assumed for this example:

| | |
|---|---|
| Resistor 36 | 10 kΩ |
| Resistor 40 | 2.4 kΩ |
| Capacitor 32 | 22 nF. |

During time $t_1$ (FIG. 9A), capacitor 32 charges up through resistor 36 in accordance with an e-function. The time required for the capacitor to charge up from $U_{cmax}$ to $U_{cmin}$ is therefore given approximately by:

$$t_1=((u_{cmax}-u_{cmax})\times R36 \times C32)/(U_B-u_{cmin}) \quad (1)$$

With the values indicated, equation (1) yields $t_1$=44 μs.

Capacitor 32 discharges from $u_{cmax}$ to $u_{cmin}$ through resistor 40 and transistor 42, again in accordance with an e-function, i.e.

$$u_{cmin}=u_{cmax}\times\exp(-t_2/(R40\times C32)) \quad (2)$$

The result of iterating equation (2), for $t_2$=5.4 μs and $u_{cmax}$=3.9 V is a value $u_{cmin}$=3.52 V.

The result in this quantitative example is therefore a time $t_1$=44 μs for capacitor 32 to charge up from 3.5 V to 3.9 V, and a time $t_2$=5.4 is for it to discharge from 3.9 V to 3.5 V, i.e. a total period T=44+5.4=49.4 μs, corresponding to a frequency slightly greater than 20 kHz. The pulse duty factor is 5.4/49.4=0.11, i.e. slightly greater than ⅒.

It is possible, by selecting resistors 36, 40 and capacitor 32, to precisely adjust times $t_1$ and $t_2$—and thus also time T and the pulse duty factor—to the execution time of the program shown in FIG. 3 or 4. It has been found that the pulse duty factor preferably lies in the range from ⅕ to ⅒.

If the voltage $u_{cmax}$ at capacitor 32 has a tendency to rise, the discharge current also conversely increases during time $t_2$. In normal operation, the voltage $u_c$ at capacitor 32 thus always remains in the desired voltage band 99, i.e. in this example between 3.5 V and 3.9 V, and does not tend to wander out of that voltage band 99 even if the components have slightly different values due to unavoidable tolerances.

Time $t_1$, which (like time $t_2$) is predefined by the program, is needed in the program sequence of a motor for internal operations, e.g. in order to control commutation (cf. FIG. 16), or possibly to monitor motor speed, regulate motor speed, etc. This time is thus substantially dictated by the motor's requirements. It is generally between 30 and 150 μs, depending on the number of functions which must be performed during this period and on the clock frequency of microprocessor 20. It can be extended, if necessary, with additional NOP instructions.

Time $t_2$ in the program sequence can be correspondingly adjusted to requirements, for example using corresponding NOP instructions S66 (FIG. 3) or S88 (FIG. 4). It is thus possible, by appropriate selection of time $t_2$, to define the pulse duty factor at the requisite value; and by selecting the values of capacitor 32 and resistors 36 and 40, the voltage $u_c$ can be held within the desired voltage band 99 (FIG. 8) when microprocessor 20 is operating normally. The time $T=t_1+t_2$ (FIG. 5) determines how many times per second loop S74 (FIG. 3) or S94 (FIG. 4) will be run through. For a time $T=49.4$ $\mu$s, for example this loop will be run through 20,250 times per second, and, during each of these passes, the voltage $u_c$ at capacitor 32 fluctuates between $U_{cmin}$ and $u_{cmax}$ (FIG. 9B), i.e. remains in the "safe" range 99 of FIG. 8.

In other words, by dimensioning capacitor 32 and resistors 36, 40, and by monitoring the voltage $u_c$ at capacitor 32, the program sequence can, so to speak, be represented by an analog circuit. If the program sequence is normal, then the voltage $u_c$ is also normal. If the program sequence is disturbed, then the voltage $u_c$ assumes abnormal values, and these abnormal values in turn act on the program sequence and renormalize it (by way of a reset operation). This takes place a) if $u_c$ becomes too low; and
b) if $u_c$ becomes too high.

FIGS. 10A and 10B show the situation of FIG. 6, i.e. the P0B2 signal is continuously "high". During the period $t_5$ the voltage $u_c$ increases, and at instant $t_{10}$ it attains the value $U_{reshigh+}$, so that circuit 30 begins to oscillate and generates, at output 48, a "low" signal which is conveyed directly to input 3 of the microprocessor where it initiates a reset operation, provided the duration of that "low" signal exceeds a minimum duration of, for example, 10 $\mu$s. At the same time, capacitor 32 is slightly discharged through resistor 38, so that the voltage $u_c$ is once again in the desired range and the P0B2 signal is generated with its frequency of 20 kHz. The result, as shown in FIG. 10A, is only a minor interruption in the sequences, i.e. the WD apparatus as shown in FIG. 1 becomes active within a few microseconds and restores normal operation.

FIGS. 11A and 11B show the situation in which the P0B2 signal becomes "low" at instant $t_{11}$, as a result of a fault (cf. FIG. 7). In this situation, transistor 42 is continuously conductive, so that capacitor 32 is discharged during the time period $t_6$ and ultimately assumes a voltage in reset range 97, initiating a reset operation so that the normal P0B2 signal is restored beginning at time $t_{12}$. Here again, as is evident from FIG. 11A, the abnormal state lasts only a few microseconds, i.e. the fault is remedied very quickly.

Figure 12:
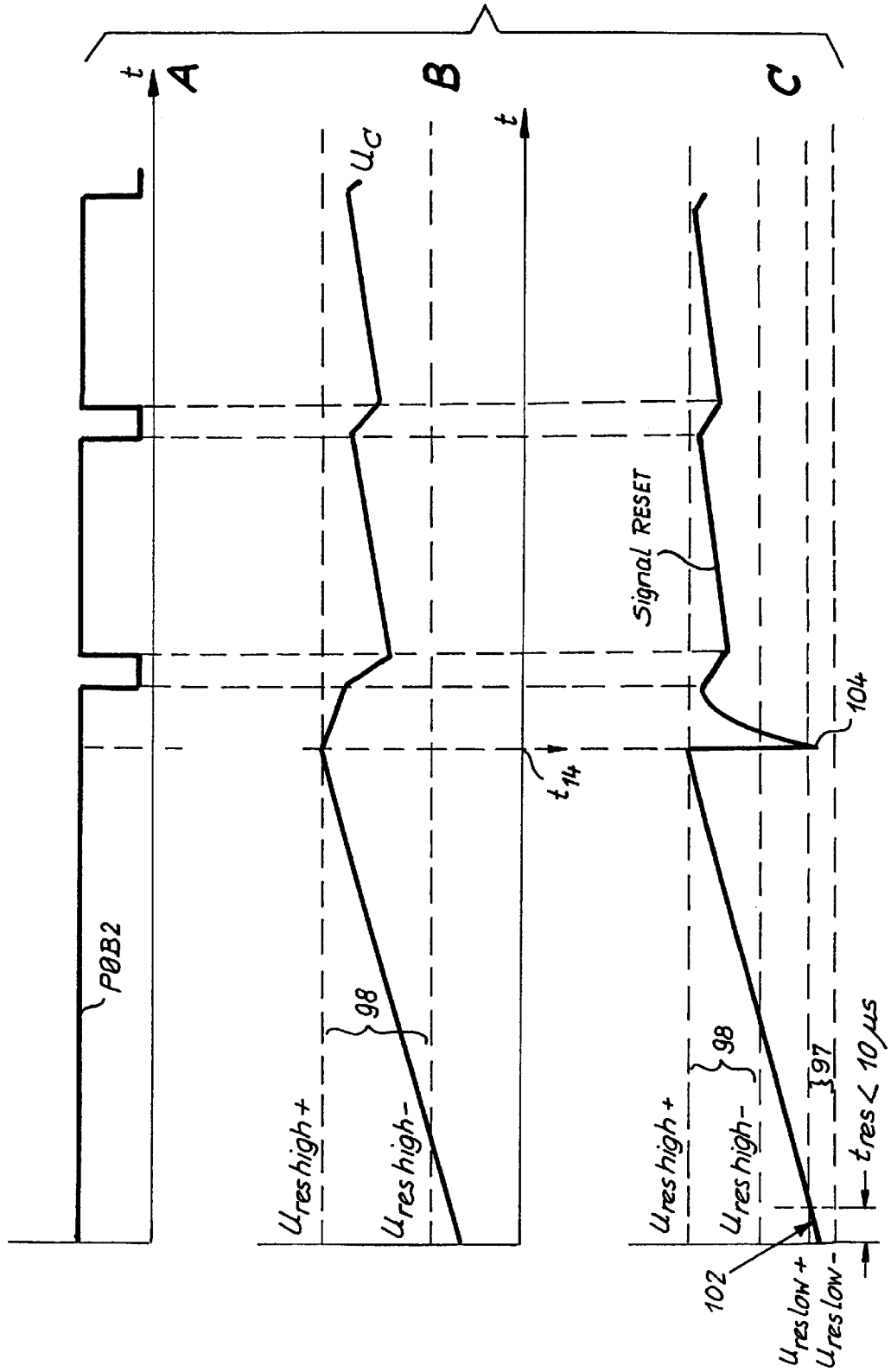
FIG. 12 shows diagrams to explain the manner of operation upon activation.

FIG. 12 shows the operation of the watchdog at start-up, specifically for the unfavorable situation in which the residence time of the RESET signal in reset range 97 (this residence time being labeled 102 in FIG. 12C) is very short, for example less than 10 $\mu$s. In extreme cases, this time can in fact be zero. Normally during start-up, the RESET signal has a residence time in range 97 of longer than 10 $\mu$s, and this then immediately results in a power-up reset as described by step S60 in FIG. 3 or S80 in FIG. 4. This applies if the increase in operating voltage is sufficiently rapid.

Since the short duration of segment 102 means that no reset operation is initiated there, it is evident from FIG. 12B that the voltage $u_c$ at capacitor 32 rises until it reaches the value $U_{reshigh+}$ at time $t_{14}$, so that output 48 of comparator 34 becomes "low" and a reset signal 104 (FIG. 12C) is generated at input 3, and then effects a normal program start.

Figure 17A:
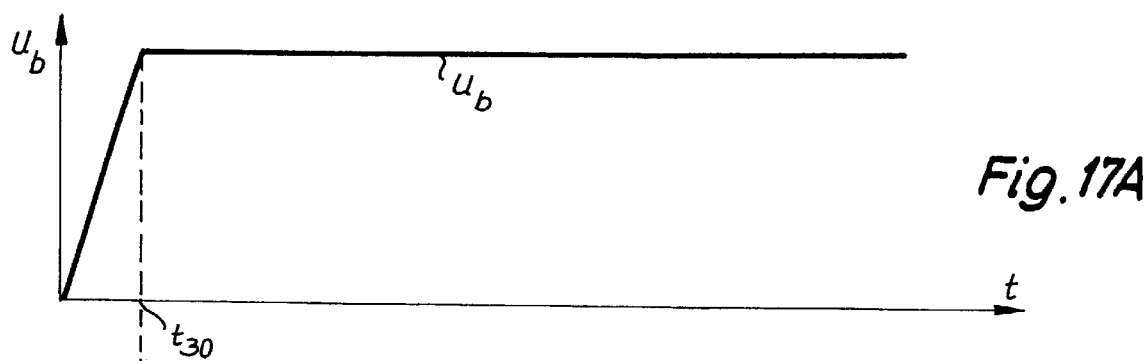
FIGS. 17A and 17B show the situation of a normal power-up reset.
Figure 17B:
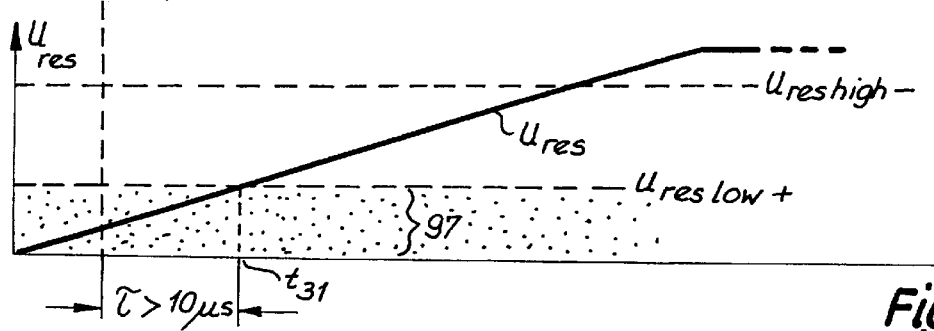

FIGS. 17A and 17B show the situation of a normal power-up reset. The operating voltage rises rapidly (FIG. 17A), and at time $t_{30}$, has already reached the value $U_b$ necessary for operation of microprocessor 20. On the other hand, the voltage $U_{res}$ at reset input 3 of microprocessor 20 rises relatively slowly, and does not exceed the value $U_{reslow+}$ until time $t_{31}$. The elapsed time tau between $t_{30}$ and $t_{31}$, is more than 10 $\mu$s, and a reliable reset operation therefore occurs upon start-up.

Figure 18A:
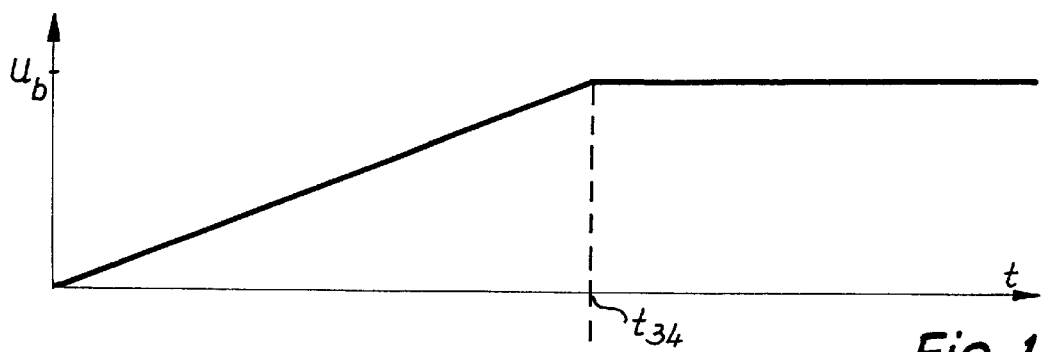
FIGS. 18A and 18B show the situation when operating voltage rises too slowly and the external watchdog circuit must generate a reset pulse to ensure reliable start-up of the program.
Figure 18B:
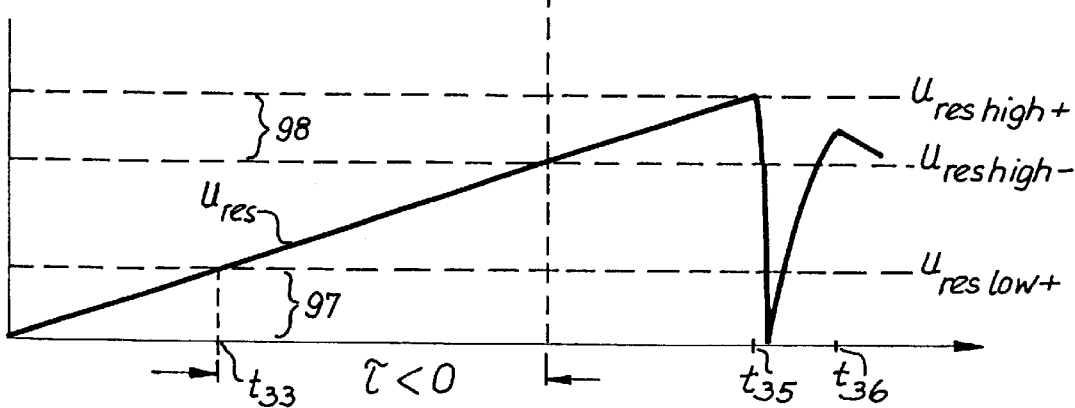

The situation is different in FIG. 18, in which (cf. FIG. 18A) the operating voltage of microprocessor 20 rises quite slowly to the value $U_b$ necessary for operation of microprocessor 20, and does not reach $U_b$ until time $t_{34}$. At an even earlier time $t_{33}$, however, the voltage $U_{res}$ at reset input 3 has already left range 97 in which a reliable reset operation would have been possible; in other words, a "normal" power-up reset is impossible in this situation, since the elapsed time tau between $t_{33}$ and $t_{34}$ is less than zero. In this situation, if the voltage reaches $U_{reshigh+}$ at time $t_{35}$, the external WD generates a reset pulse at output 48 (FIG. 1, 13, or 14) which then ensures a reset operation and thus reliable start-up of the program beginning approximately at time $t_{36}$ (see FIG. 18B).

Figure 13:
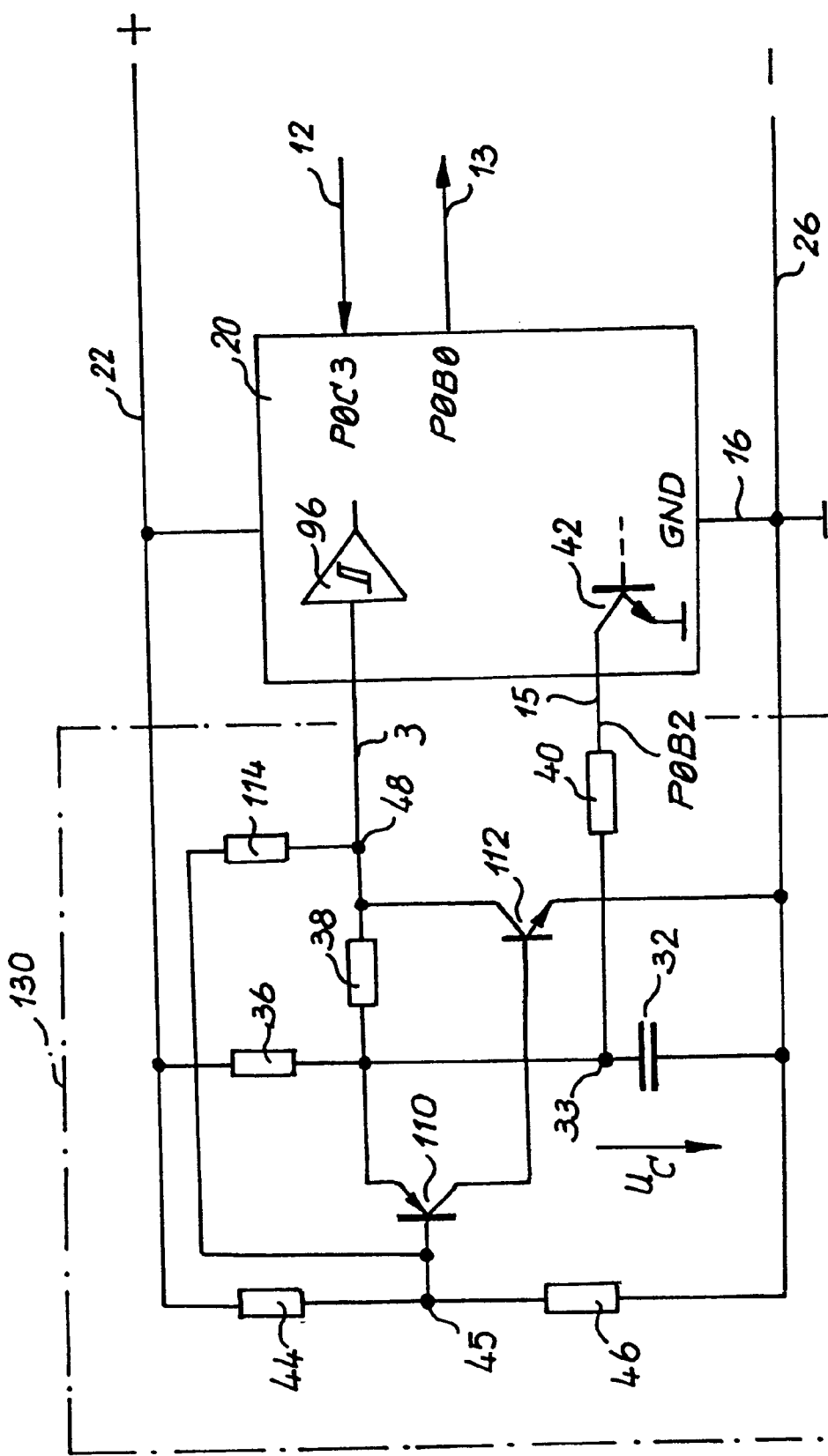
FIG. 13 shows a variant of the apparatus depicted in FIG. 1.
Figure 14:
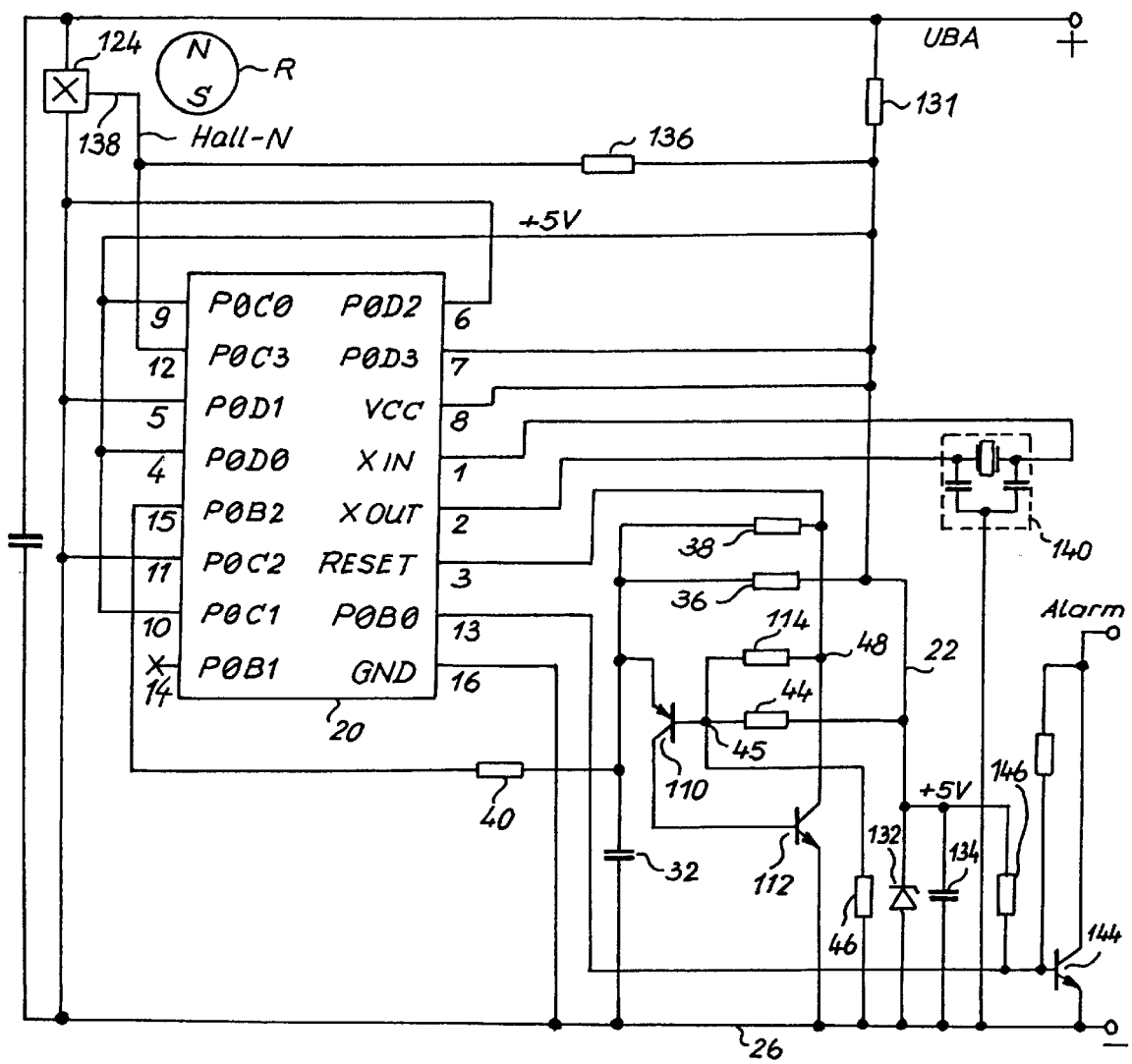
FIG. 14 shows a rotation speed monitoring circuit that is configured using the variant as shown in FIG. 13.

A WD apparatus of this kind as shown in FIG. 1, 13, or 14, although inexpensive, thus provides considerable additional reliability, specifically in applications in which many disturbance pulses occur, or in which it is impossible to predict the manner in which the operating voltage will rise after power-up.

FIG. 13 shows a more inexpensive variant of FIG. 1. Here comparator 34 of FIG. 1 is replaced by a PNP transistor 110 and an NPN transistor 112. Parts identical, or functioning identically, to those in FIG. 1 are labeled with the same reference characters and usually are not described again. Component values are substantially the same as those indicated in FIG. 1.

In this case, node 45 is connected to the base of transistor 110 and, via a resistor 114, to input 3 of microprocessor 20 and to the collector of transistor 112, whose emitter is connected to negative line 26 and whose collector is connected, via a resistor 38, to node 33. Also connected to the latter is the emitter of transistor 110, whose collector is connected to the base of transistor 112.

The mode of operation is the same as in FIG. 1, i.e. when the voltage $u_c$ has reached the threshold voltage of transistor 110, the latter becomes conductive, so that transistor 112 also becomes conductive and discharges capacitor 32 through resistor 38, and via resistor 114 (corresponding to resistor 50 of FIG. 1) reduces the threshold voltage of transistor 110 and conveys, to input 3 of microprocessor 20, a "low" signal constituting a reset signal.

When capacitor 32 is sufficiently discharged, transistor 110 again becomes nonconductive, as does transistor 112, so that capacitor 32 can once again charge up via resistor 36.

The principle here is once again that of an oscillator, the two transistors 110, 112 in combination constituting a replacement for a unijunction transistor (UJT). The oscillator, here labeled 130, is again kept from oscillating by the fact that capacitor 32 is continuously discharged through resistor 40, at a low current, as long as microprocessor 20 is operating correctly and is generating at its output 15 the P0B2 signal shown in FIG. 5, as already described in detail.

The circuit according to FIG. 13 has a greater temperature dependence than the circuit according to FIG. 1, but has proven quite successful in practical experiments.

Figure 15:
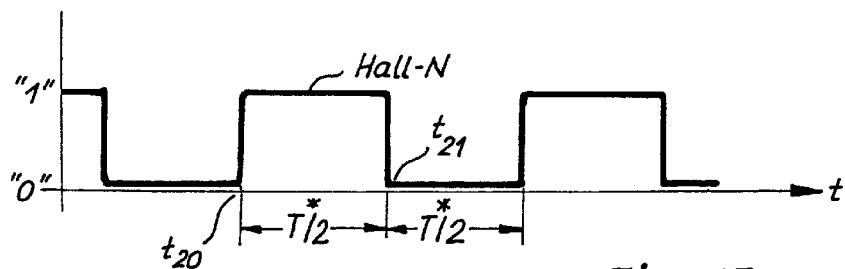
FIG. 15 shows a diagram to explain the Hall-N signals generated in FIG. 14 by sensor 124 when rotor R is rotating.

FIG. 14 shows the utilization of the circuit according to FIG. 13 in an apparatus for rotation speed monitoring, for example for a motor, of which only the permanently magnetized rotor R is depicted here; that rotor is arranged in the vicinity of a Hall IC 124, so that when rotor R rotates, this Hall IC delivers digital Hall signals Hall-N as depicted schematically in FIG. 15. At a specific rotation speed of rotor R, the high range of these signals has a duration T*/2, as does the low range, as depicted in FIG. 15.

If the two-pole rotor R is rotating at a speed of 3000 rpm, i.e. 50 revolutions per second, time T* is then 20 ms, i.e. the duration of T*/2 is 10 ms.

This time T*/2 is monitored by microprocessor 20, and if it rises above a predefined value, this means that rotor R is rotating too slowly or has stopped. In that case, an alarm is triggered. Among the functions of the WD circuit, according to the invention, is to make a rotation speed monitoring system of this kind extraordinarily reliable. A rotation speed monitoring system of this kind is also very inexpensive and can be installed in a very small space, for example even in a small electronically commutated motor.

The reference characters used in FIG. 14 are the same as those for identical or identically functioning parts in FIG. 13, and the relevant parts are usually not described again. By way of a dropping resistor 131, a Zener diode 132, and a smoothing capacitor 134, a regulated DC voltage of, for example, +5 V is generated on line 22, derived from a voltage UBA of, for example, 12 V to which Hall IC 124 is directly connected. Terminals 4, 7, 8, 9, and 18 of microprocessor 20 are connected to line 22. The pull-up resistor for output 138 of Hall IC 124, which is connected to terminal 12 of microprocessor 20, is labeled 136. (These terminals are depicted at enlarged scale in FIG. 2, along with the signal designations for these terminals.)

An oscillator crystal 140 is connected to terminals 1 and 2 of microprocessor 20. Terminals 5, 6, 11, 16 are connected to negative line 26.

When an alarm signal is generated, a "high" signal (P0B0=1) is produced at output 13, so that a transistor 144 receives a base current through a resistor 146, becomes conductive, and generates, at an ALARM output, a corresponding signal, for example an acoustic or optical signal (not depicted).

The rotation speed that is to be monitored, for example 1500 or 3000 rpm, is coded by the fact that specific inputs of microprocessor 20 are set to specific potentials, for example inputs 6, 7, 9, 4, 5, 10, and 11.

Figure 16:
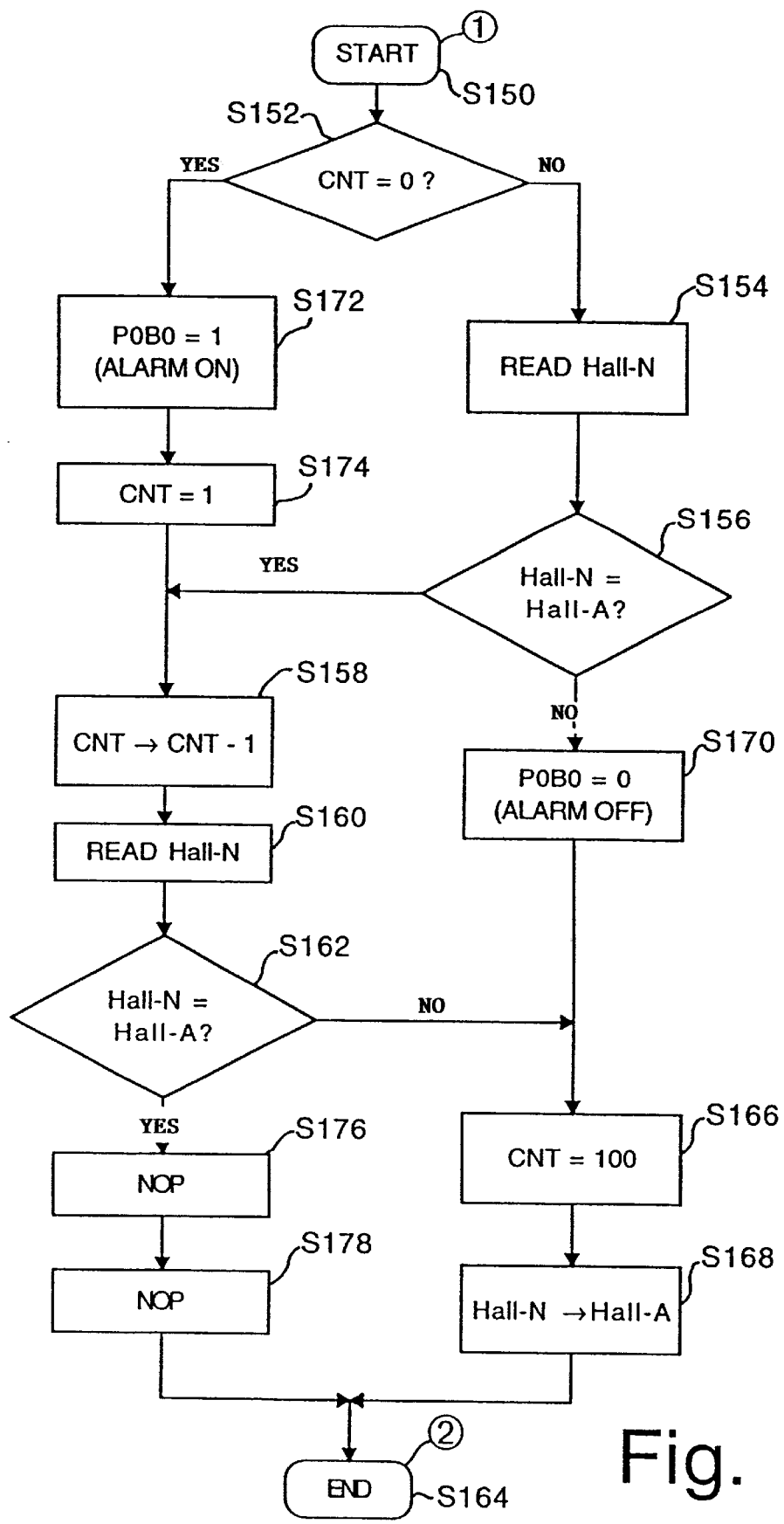
FIG. 16 shows a flowchart to explain the program section designated S70 when an apparatus according to the present invention is used in the circuit as shown in FIG. 14.

FIG. 16 shows program segment S70 of FIGS. 3 and 4 for the case of a rotation speed monitoring system as depicted in FIG. 14. The program segment begins with step S150, corresponding to the point labeled (1) in FIGS. 3, 4, and 16. (If the program is used for commutation of an electrically commutated motor, this program segment corresponds to one counting loop run during the commutation time measurement.)

At S152 the program checks whether a counter CNT (in microprocessor 20) has the value 0. (As already described, this value is set to 100 upon initialization in S62 or S82, i.e. for example after a reset operation.) If NO, then in step S154 the value of the Hall signal at output 138 is read, and in step S156 the program compares whether this value Hall-N is identical to a previously stored value Hall-A. Identity means that the Hall signal has not changed. Non-identity means that the Hall signal has changed, for example at points $t_{20}$, or $t_2$, in FIG. 15.

If the response at S156 is YES, the program proceeds to step S158 where counter CNT is decremented by a value 1.

Then in step S160 the Hall signal at output 138 is read out again, and in step S162 the program again checks whether the Hall signal has changed. If it has not changed, the program segment shown in FIG. 16 is terminated, and execution proceeds (via NOP steps S176, 178) to step S164. This step is labeled (2) in FIGS. 3, 4, and 16.

A time measurement is made by executing FIG. 3+FIG. 6, or FIG. 4+FIG. 16, which requires a time of e.g. 50 µs; in other words, 10 loop runs require, for example, 10×50 µs=0.5 ms, and 100 loop runs require 5 ms. Counter CNT counts the number of loop runs, and its content thus represents an indication of the time measured between two successive changes in the Hall-N signal, i.e. for example between $t_{20}$ and $t_{21}$, in FIG. 15.

If it is found in step S162 that the Hall signal has changed (response=NO), a new time measurement begins in counter CNT and that counter is therefore reset to 100 in step S166; in the following step S168, the new value Hall-N is shifted into register Hall-A and stored there.

If it is found in step S156 that the Hall signal has changed (response=NO), then in step S170 the P0B0 signal at output 13 is set to "0", i.e. any alarm that may previously have been present is automatically deleted, since a change in the Hall-N signal before counter CNT has reached a value of zero means that the rotation speed is once again correct.

If it is found in step S152 that counter CNT has reached a value of 0, this means that the program has looped through 101 times from S150 to S164 with no change in the Hall signal Hall-N, i.e. either that rotor R is stationary, or that its rotation speed is lower than a predefined lower limit speed. In this case, therefore, in step S172 the P0B0 signal at output 13 is set to "1", i.e. an alarm is triggered. In the next step S174 a value of 1 is set in counter CNT, so that the count status of counter CNT does not become negative in the next step S158.

It should be noted that the flowchart of FIG. 16 can be executed in various fashions, and that regardless of said fashion, the time periods required therefor are always the same, for example 25 µs. This can be achieved by inserting so-called "inert" instructions in certain program branches. For example two NOP instructions S176, 178 are shown at the YES output of program step S162, so that the resulting program execution time there is the same as when the parallel program steps S166, S168 are executed. If applicable, corresponding NOP instructions must also be inserted at other points in the program segment of FIG. 16, depending on the time required by the individual program instructions.

The result is that in FIG. 3 or 4, the time required to execute a program loop is always the same, yielding a constant frequency for the P0B2 signal.

Numerous variations and modifications are of course possible in the context of the present invention. It should be noted in particular that the applicability of an apparatus according to the present invention is in no way limited to rotation speed monitoring of a rotor, but rather that program segment S70 as depicted in FIG. 16 is only one preferred example of the extremely wide variety of programs that are usable in the context of the present invention. For example, it would also be possible for capacitor 32 to be discharged during time $t_1$ and charged during time $t_2$.

What is claimed is:

1. A circuit including a microprocessor and a watchdog circuit for the microprocessor, the microprocessor having a control output that, when the microprocessor is operating normally, periodically delivers, under program control, a pulse train of periodic pulses separated by pulse intervals, said pulse train having a predefined duty factor ($t_2/T$), comprising a charging circuit, a capacitor adapted to be charged via the charging circuit, a discharging circuit controlled by said pulse train, for periodic discharge of said capacitor;

wherein the charging circuit and discharging circuit are so matched to the frequency and duty factor ($t_2/T$) at said control output that during normal program execution, charging of the capacitor via the charging circuit corresponds to discharge thereof via the discharging circuit, so that the voltage ($u_c$) at said capacitor rises and falls within a predefined voltage range during normal program execution, and further comprising at least one circuit, for monitoring the charge state of said capacitor, which, in the event of a high charge voltage ($u_c$) on said capacitor which does not arise during normal operation, generates a reset signal for application to the microprocessor, the charge voltage of said capacitor being applied to a reset input of the microprocessor, the charging circuit and the discharging circuit of said capacitor being so arranged that, in the absence of a predetermined signal at said control output, said charge voltage ($u_c$) on said capacitor, and applied to said reset input, falls to a lower value, thereby triggering a reset operation.

2. The circuit as defined in claim 1, wherein said periodic pulse train, occurring in normal operation at said control output and controlling said discharge via said discharge circuit, has a duty factor ($t_2/T$) falling within a range between 10% and 20%.

3. The circuit as defined in claim 1, in which the capacitor, together with a circuit which monitors its charge state, form a voltage-controlled oscillator which is activated by a high voltage ($u_c$) on said capacitor.

4. A circuit as set forth in claim 1, wherein the circuit monitors itself by the steps of:

during iterative program execution in said microprocessor, polling the content of at least one memory element (VAR) which, during normal operation, contains a predetermined value (AB);

in the event that said polling returns a value deviating from said predetermined value, changing, under program control, the temporal course of an output signal generated at said control output of the microprocessor;

monitoring the temporal course of said signal; and in the event of a deviation in said temporal course, generating a reset signal for application to the microprocessor.

5. The circuit of claim 4, wherein the microprocessor has at least one input which monitors the rotation speed of a rotating part.

6. The circuit as defined in claim 3, in which a natural oscillation frequency of said oscillator is lower than the frequency of said pulses (P0B2) periodically occurring at said control output during normal operation.

7. The circuit as defined in claim 4, further comprising, in the event of a reset operation, setting at least one memory element (VAR), accessible by the microprocessor, to at least one predefined value (AB); and checking the value in said memory element during each iteration of program execution.

8. The circuit as defined in claim 4, further comprising, if a value deviating from said predetermined value (AB) occurs, branching program execution into an endless loop (S76) for maintaining constant the output signal at said control output.

9. The circuit as defined in claim 4, further comprising, upon occurrence of a deviating value, skipping program segments (S86, S88, S90) which, when executed, effect an output signal change at the control output.

10. The circuit as defined in claim 4, further comprising in the event of detection of a deviation in at least one of the signal value and the frequency of said output signal generated at the control output of the microprocessor, activating an oscillator provided outside the microprocessor to thereby generate a reset signal for application to the microprocessor.

11. The circuit as defined in claim 4, wherein, in accordance with the output signal arising at said control output of the microprocessor, the voltage at said capacitor is so controlled by repetitive charging and discharging processes that, during normal operation, said voltage is maintained within a predetermined voltage value range, in which no reset process is triggered.

12. The circuit of claim 4, wherein said program execution includes steps which monitor the rotation speed of a rotating part.

13. The circuit as defined in claim 11, wherein, upon occurrence of a value deviating from said predetermined value of the control signal at said control output, the voltage ($u_c$) at said capacitor is varied such that it goes beyond said predetermined voltage value range within which no reset process is triggered.

* * * * *

UNITED STATES PATENT AND TRADEMARK OFFICE
CERTIFICATE OF CORRECTION

PATENT NO. : 6,463,546 B1
DATED : October 8, 2002
INVENTOR(S) : Frank Jeske and Herman Rappenecker It is certified that error appears in the above-identified patent and that said Letters Patent is hereby corrected as shown below:

Title page,
Item [56], References Cited, U.S. PATENT DOCUMENTS,
"5,942,926 A   8/1999        Yamaguchi      3327/156" should be
-- 5,942,926 A   8/1999        Yamaguchi      327/156 --.
Item [57], ABSTRACT,
Lines 4 and 8, "$(t_1)$" should be -- $(t_2)$ --.

Column 2,
Line 20, "WI" should be -- WD --.
Line 55, "11B" should be -- 10B --.

Column 4,
Line 5, "NBC" should read -- NEC --.

Column 6,
Line 48, "$t_1$" should be -- $t_2$ --.

Column 11,
Line 64, "$t_2$," should be -- $t_{21}$ --.

Column 13,
Line 51, "claim 4" should be -- claim 1 --.

Signed and Sealed this

Twenty-fourth Day of January, 2006

JON W. DUDAS
*Director of the United States Patent and Trademark Office*